Jan. 31, 1967   J. B. BROWNING   3,301,503
RETRACTABLE SEAT BELT UNIT
Filed Jan. 11, 1965   2 Sheets-Sheet 1

INVENTOR.
JOSEPH B. BROWNING
BY
Richard K. Macneill

Jan. 31, 1967  J. B. BROWNING  3,301,503
RETRACTABLE SEAT BELT UNIT
Filed Jan. 11, 1965  2 Sheets-Sheet 2

INVENTOR.
JOSEPH B. BROWNING
BY
Richard K. Macneill

United States Patent Office 3,301,503
Patented Jan. 31, 1967

3,301,503
RETRACTABLE SEAT BELT UNIT
Joseph B. Browning, 323 Paloma Lane,
El Cajon, Calif. 92021
Filed Jan. 11, 1965, Ser. No. 424,606
3 Claims. (Cl. 242—107)

This invention relates generally to vehicle seat belts and particularly to a retractable seat belt of simplified and improved form.

This application is a continuation-in-part of my copending application filed July 1, 1963, Serial No. 291,858, for Retractable Seat Belt Unit, now abandoned.

Background

Aircraft seat belts, due to the frequent necessity for abrupt maneuvers in turbulent air or to avoid collision and other accidents, are considered essential to safe operation and are provided, therefore, as standard equipment in all aircraft. While automotive vehicle seat belts are not mandatory, they are valuable protective devices in case of sudden stopping and serious accidents. Currently, automotive vehicle seat belts are furnished as optional equipment by some vehicle manufacturers. Additionally, many individual vehicle owners have installed seat belts for driver and passenger protection.

In view of the wide use of seat belts in a large variety of vehicles, a commensurately large variety of seat belts are available, some being non-retractable, others being retractable, and still others having special features such as automatic locks, releases, and belt length adjustment.

Prior art seat belts having retractable and other special features are expensive and often develop defects in service, the cost and unreliability varying directly with complexity. The more complex seat belts usually are designed for a particularly vehicle and are not suitable for installation in other types of vehicles.

The instant invention is a retractable seat belt having a rugged retracting mechanism of novel design for installation in virtually all types of aircraft, automotive vehicles, and other mobile personnel carriers.

Object

It is a principal object of this invention to provide an improved, simplified retracting mechanism for a variety of seat belts such as installed in automotive vehicles, aircraft, and the like.

It is another object of this invention to provide a seat belt assembly having improved means for attaching the belt and mounting of the retracting spring, the latter being made easily accessible, for replacement and easy adjustment.

It is still another object of this invention to provide a seat belt and retracting mechanism capable of being mounted in three different orientations relative to the frame of the vehicle and adaptable to various types of automotive vehicles and aircraft.

It is a further object of this invention to provide a retractable seat belt unit capable of adequate and reliable service while using a minimum number of parts, thus reducing manufacturing and maintenance costs relative to more complicated prior art seat belts.

With these and other objects definitely in view, this invention consists in the novel combination and arrangement of elements as will be hereinafter fully described in the specification, particularly pointed out in the claims, and illustrated in the drawings that form a material part of this disclosure in which:

Similar characters of reference indicate similar or identical elements and portions throughout the specification and throughout the views of the drawing.

Detailed description

Figure 1:
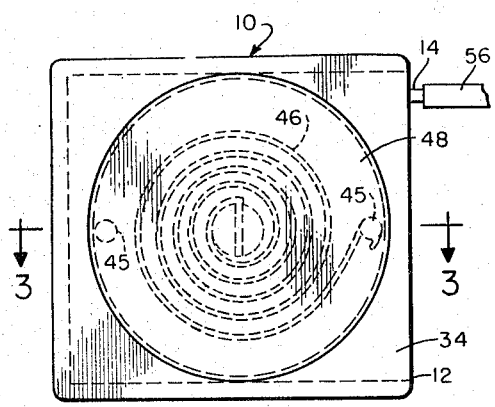
FIG. 1 is a side elevation view of the unit.
Figure 2:
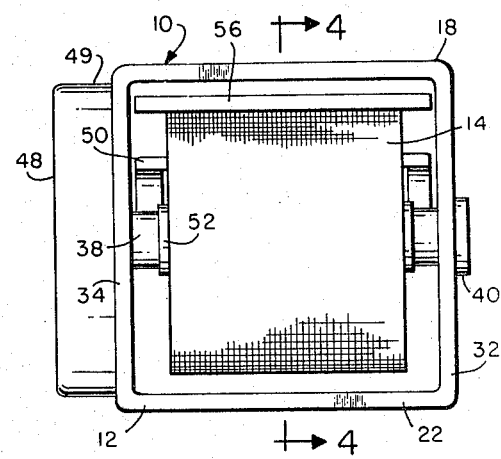
FIG. 2 is an end elevation view as taken from the righthand end of FIG. 1.
Figure 3:
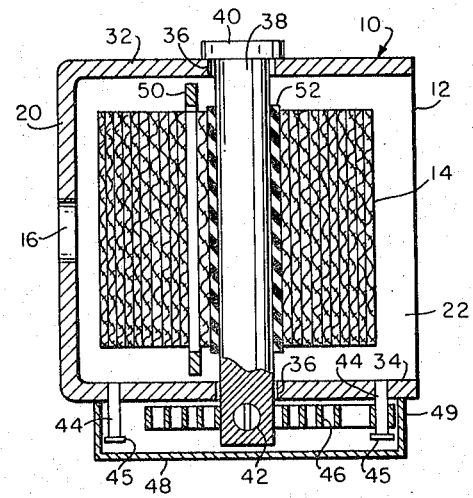
FIG. 3 is a sectional view taken on line 3—3 of FIG. 1.
Figure 5:
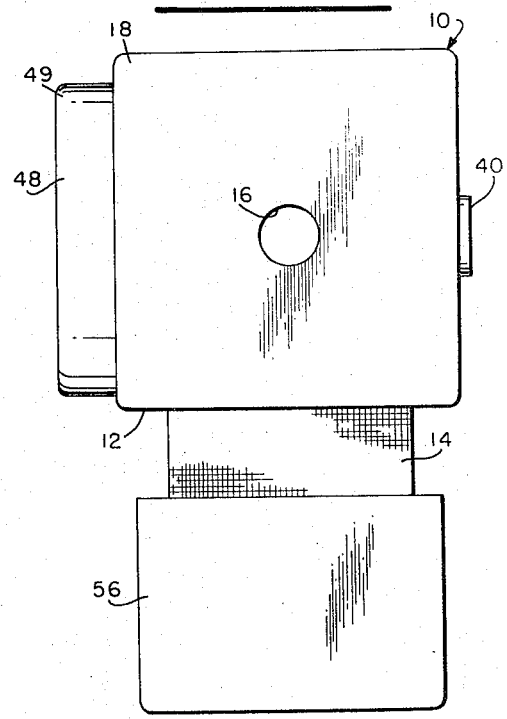
FIG. 5 is a top plan view of the unit.

The drawings illustrate clearly the simplicity and utility of the instant invention. All parts subject to strain are constructed of materials with sufficient tensile strength to withstand a pull test of 6,000 pounds when the buckled seat belt members and retracting mechanism are bolted to a structural member such as the floor or chassis of a vehicle. Accordingly, housing 10 has walls of substantial thickness and tensile strength.

Housing 10 has an open front 12, thus providing unrestricted egress for belt member 14 regardless of which of the three operative positions in which housing 10 is mounted. A choice of mounting positions to fit particular installation requirements is provided by bolt holes 16 in top wall 18, back wall 20, and bottom wall 22, the terms "top," "bottom" and "back" being used for convenience of reference only and referring to the corresponding walls when the housing is disposed as represented in FIG. 4, for example.

Figure 4:
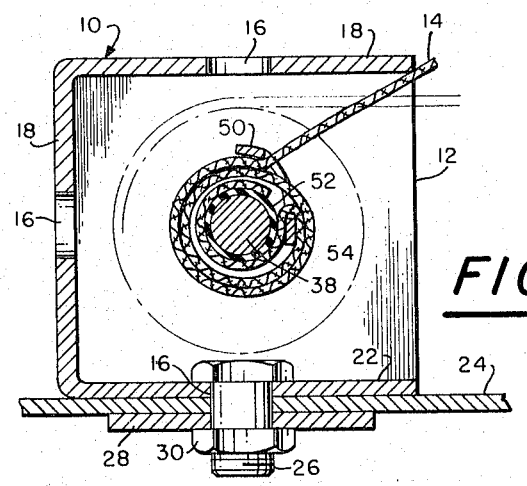
FIG. 4 is a sectional view taken on line 4—4 of FIG. 2, showing attachment of the unit to a structural member.

A typical, partial installation is illustrated in FIG. 4, wherein bottom wall 22 is mounted flush with vehicle floor 24 by means of bolt hole 16, bolt 26, washer 28 and nut 30. In this position, belt member 14 emerges from housing 10 adjacent top wall 18. Alternatively, if back wall 20 were mounted flush with floor 24, belt member 14 would emerge from housing 10 in the righthand half portion of open front 12.

Side walls 32 and 34 contain holes 36 for insertion of tension pin 38, the thus apertured side walls functioning as simple bearings for the rotable pin 38. Tension pin 38 has a head 40 at one end and a transverse aperture 42 adjacent the other end. Side wall 34 also carries retainer pins 44 extending transversely outwardly and equidistantly spaced radially from hole 36, these pins 44 having enlarged heads 45. Both aperture 42 and retainer pins 44 serve a dual purpose as hereinafter described.

Spiral retraction spring 46 is installed adjacent the outer surface of side wall 34 and parallel thereto. One end of spring 46 is clipped around one of the retainer pins 44 and the other end is inserted in transverse aperture 42, thus locking tension pin 38 in place and, at the same time, applying torque to pin 38 as hereinafter described. While only two retainer pins 44 are illustrated, others may be installed, and the torque on tension pin 38 may be adjusted according to the retainer pin 44 selected for attachment of retracting spring 46. Retraction spring 46 is protected by cylindrical cap or cover 48, cover 48 being snapped onto and held on retainer pins 44. Thus, retainer pins 44 anchor one end of retraction spring 46 and hold cover 48 in place at the same time, the snap action being achieved by virtue of resiliency in the cap or cover 48, the rim 49 snapping over the enlarged heads 45 of the retainer pins 44. By this dual use of parts, maximum simplicity is achieved and production costs are reduced.

Unique means are provided for securing belt member 14 to tension pin 38. Rivets, screws, or the like could be used, but such use would weaken pin 38 and increase cost. Instead, the securing apparatus consists simply of clip 50, which may be augmented by sleeve 52. Clip 50 consists of an elongated rectangular, link-like open-centered frame having a generally arcuate transverse cross section to fit the contour of belt member 14 when looped through clip 50 and around pin 38, the rectangular central opening being slightly longer than said belt width and wide enough to accommodate several belt thicknesses when said belt is looped therethrough. Clip 50 may be constructed of metal, strong plastic, or other suitable material. Sleeve 52 may be used for more positive prevention of belt slippage. Sleeve 52 is composed of resilient material, such as rubber, and fits tightly on tension pin 38. When belt member 14 is looped snugly through clip 50 and around sleeve 52, the resiliency of sleeve 52 binds belt member 14 frictionally to pin 38 and prevents belt slippage.

As illustrated in FIG. 4, end 54 of belt member 14 is looped around sleeve 52 outside clip 50. Belt member 14 then is looped several times through the opening of clip 50 and around sleeve 52. A sufficient number of loops are provided to assure a snug fit and prevent belt slippage. After attachment as thusly described, belt member 14 is wrapped onto tension pin 38 until only buckle element 56 protrudes from housing 10. Finally, spiral retraction spring 46 is attached to retainer pin 44 and tension pin 38 and cylindrical cover 48 is snapped onto retainer pins 44.

When belt member 14 is withdrawn from housing 10, retraction spring 46 applies torque to pin 38. When belt member 14 is released, the belt member is reeled into housing 10, leaving only buckle element 56 protruding. Belt member 14 may be withdrawn from housing 10 to full length for maximum restraint when a belt member pair is buckled around the waist of the user, or a portion of belt member 14 be left on tension pin 38 to permit limited movement. In either case, when unbuckled and released, belt member 14 retracts completely into housing 10, leaving buckle element 56 protruding therefrom.

Figure 6:
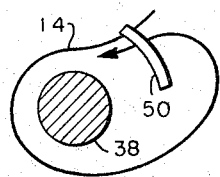
FIGS. 6–8 are end views in schematic form of a tension pin in spacial relationship to a cinch showing the steps of attaching the belt to the tension pin.
Figure 7:
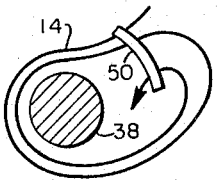
Figure 8:
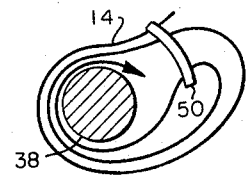
Figure 9:
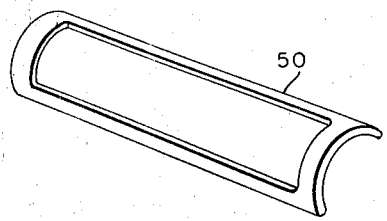
FIG. 9 is a perspective view of the clip of FIGS. 3, 4, 6, 7 and 8.

Referring to FIGS. 6, 7, 8 and 9, clip 50 is shown schematically in FIGS. 6, 7 and 8 in special relationship to tension pin or axle 38. To attach belt member 14 to tension pin or axle 38, it is first brought through clip 50 as shown in FIG. 6, and around tension pin 38 back through clip 50 but inside the first loop. One more turn is made around pin 38 as indicated by FIG. 7, and the belt is again brought through the opening in clip 50, but this time brought inside the innermost turn in an opposite direction, as indicated by FIG. 8. The belt can then be pulled tight and will hold, as shown in FIG. 4.

Figure 10:
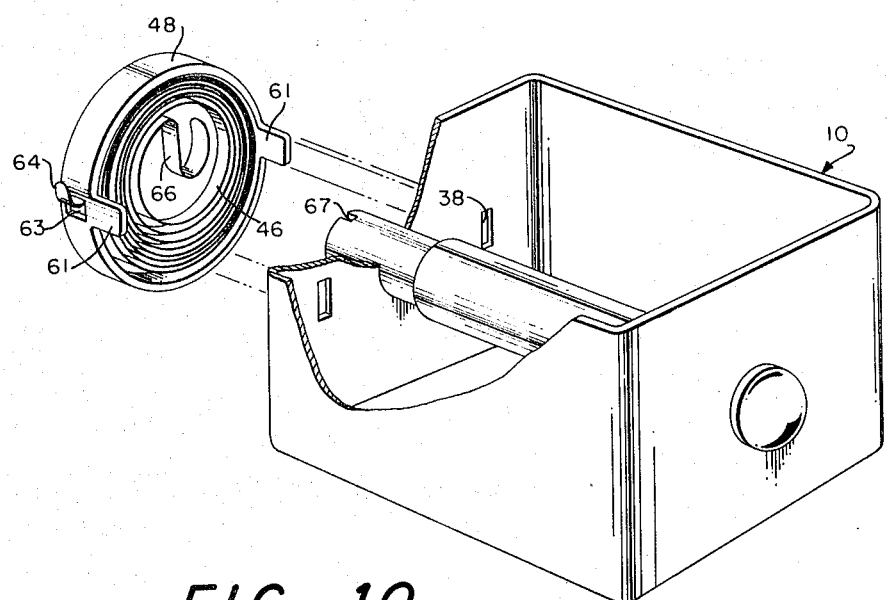
FIG. 10 is a perspective exploded view of a modified cap and coil spring and belt housing.

Referring to FIG. 10, a modified cap and coil spring arrangement is shown. Cover 48 in this embodiment has extension tabs 61 for cooperation with slots 62 in side wall 34 housing 10. In this embodiment, one end of coil spring 46 is taken through slot 63 in cap 48, the bent tab 64 securing the spring thereto. In installing the cap, the inner end 66 of spring 46 is pulled through slot 67 of tension pin 38, and the entire cap is then rotated to tighten tension spring 46. Extension tabs 61 are then lined up with slots 62 in sidewall 34 for housing 10 and press fit therein. To further secure the cap to the housing, tabs 61 can then be bent.

It is understood that minor variation from the form of the invention disclosed herein may be made without departure from the spirit and scope of the invention, and that the specifications and drawing are to be considered as merely illustrative rather than limiting.

What is claimed is:
1. An attaching means for securing a free end of a belt-like member to a cylindrical member comprising:
 (a) a cylindrical member; and
 (b) a clip consisting of an elongated rectangular frame having an arcuate cross section and a rectangular opening therein;
 (c) said one end of said belt-like member being wrapped through said clip and around said cylindrical member at least two turns, the second being inside the first, and a third at least partial turn being wrapped through said clip and around said cylindrical member in an opposite direction from said at least two turns inside said second turn.
2. An attaching means for securing a free end of a belt-like member to a cylindrical member comprising:
 (a) a cylindrical member;
 (b) a clip consisting of an elongated rectangular frame having an arcuate cross section and a rectangular opening therein; and
 (c) said one end of said belt-like member being wrapped through said clip and around said cylindrical member at least one turn, and at least a partial turn being wrapped through said clip and around said cylindrical member in an opposite direction from and inside said at least one turn.
3. A retractable seat belt unit comprising:
 (a) a hollow housing having side walls;
 (b) an elongated tension pin extending through opposite side walls of said housing;
 (c) a spiral retraction spring disposed within a cylindrical cover, said spring having one end attached to said cover and the other end attached to said tension pin adjacent one end thereof to bias said tension pin to rotate in one direction;
 (d) adjustable coupling means on said cover and one of said side walls for mounting said cover to said one of said side walls; and
 (e) a seat belt member; and
 (f) a clip consisting of an elongated rectangular frame having an arcuate cross section and a rectangular opening therein, one end of said seat belt being wrapped through said clip and around said tension pin at least one turn, and at least a partial turn being wrapped through said clip and around said tension pin in an opposite direction from and inside said at least one turn.

References Cited by the Examiner

UNITED STATES PATENTS

| | | | |
|---|---|---|---|
| 1,389,314 | 8/1921 | McMullin | 242—107.5 X |
| 1,635,608 | 7/1927 | Claveria | 242—107.5 |
| 1,685,748 | 9/1928 | Pederson | 242—107.5 |
| 2,767,426 | 10/1956 | Grupp | 242—107.5 X |
| 2,835,010 | 5/1958 | Bayon | 24—169 X |
| 2,904,280 | 9/1959 | Eckels et al. | 242—74 |
| 2,953,315 | 9/1960 | Lautier et al. | 297—388 X |
| 2,959,414 | 11/1960 | Saltz | 242—157 X |
| 2,979,282 | 4/1961 | Barecki | 297—388 X |

FOREIGN PATENTS 535,156  1/1922  France.

FRANK B. SHERRY, *Primary Examiner.*

FRANCIS K. ZUGEL, CASMIR A. NUNBERG,
*Examiners.*

R. B. FARLEY, *Assistant Examiner.*